United States Patent
Schillinger

(10) Patent No.: US 6,957,932 B1
(45) Date of Patent: Oct. 25, 2005

(54) BENTHIC SCREEN FOR CONTROLLING AQUATIC PLANT GROWTH

(76) Inventor: James K. Schillinger, 42 Valley La., Avon, NY (US) 14414

( * ) Notice: Subject to any disclaimer, the term of this patent is extended or adjusted under 35 U.S.C. 154(b) by 0 days.

(21) Appl. No.: 10/877,275

(22) Filed: Jun. 25, 2004

(51) Int. Cl.$^7$ .......................... E02D 17/20; A01G 13/00
(52) U.S. Cl. ...................... 405/302.7; 405/15; 405/17; 405/270; 47/31
(58) Field of Search ............................ 405/15, 17, 19, 405/270, 302.7; 47/9, 31, 32

(56) References Cited

U.S. PATENT DOCUMENTS

| | | | |
|---|---|---|---|
| 3,019,450 A * | 2/1962 | Karasiewicz .................... | 4/502 |
| 4,056,936 A | 11/1977 | Mayer | |
| 4,518,280 A | 5/1985 | Fletcher | |
| 4,565,468 A * | 1/1986 | Crawford .................... | 405/270 |
| 4,577,996 A | 3/1986 | Elias et al. | |
| 4,603,790 A * | 8/1986 | Gerber ....................... | 220/219 |
| 4,972,529 A * | 11/1990 | Wolfson, Jr. .................... | 4/500 |
| 4,993,870 A * | 2/1991 | Bridgewater ................. | 405/21 |
| 5,231,793 A * | 8/1993 | Allen ............................ | 47/32 |
| 6,338,169 B1 * | 1/2002 | DeGarie ......................... | 4/498 |
| 6,497,533 B2 * | 12/2002 | DeGarie ....................... | 405/52 |
| 2004/0076482 A1 * | 4/2004 | Singleton ................. | 405/302.7 |

OTHER PUBLICATIONS

"The Conesus Lake Dockside Near-Shore Lake Weed & Algae Treatment Guide" (2002 Edition) by The Conesus Lake Association, Inc. (pp. 14-17).

* cited by examiner

*Primary Examiner*—Jong-Suk (James) Lee
(74) *Attorney, Agent, or Firm*—Fred L. Denson

(57) ABSTRACT

A benthic screen for controlling aquatic plant growth comprising a sheet of flexible material, a plurality of spaced-apart, elongated retaining members that are transversely positioned across the width of the sheet and attachment means for securing each retaining member to the sheet. The sheet of flexible material is typically a polymeric material having low light transmittance such as a woven geotextile polypropylene. The retaining members are preferably a plurality of parallel positioned metal rods. The attachment means is preferably a plurality of PVC pipes wherein each pipe has a slit that passes through the pipe and extends the length thereof. A portion of the sheet is inserted into a slit and looped around a retaining rod that is encased in the pipe. The structure of the screen renders it self anchoring and provides channels for removing plant decomposition gases that would otherwise accumulate under the screen.

7 Claims, 4 Drawing Sheets

BENTHIC SCREEN FOR CONTROLLING AQUATIC PLANT GROWTH

BACKGROUND OF THE INVENTION (A) Field of the Invention

This invention relates generally to a benthic screen for controlling aquatic plant growth typically found near shoreline areas of lakes, ponds, rivers and similar bodies of water.

(B) Description of the Prior Art

The growth of aquatic plants and vegetation in near-shore areas, i.e. in areas less than 200 feet from shore or in water less than 6 feet deep, has rendered many beach, shoreline and coastline areas unsuitable for swimming, boating or other recreational water activities. Typical unwanted growth includes seaweed, lake weed, Eurasian watermilfoil, hydrilla, curly leaf pond weed, duck weed, coontail, elodea, naiad, water lilies and the like. Physical, mechanical as well as chemical methods have been utilized to control the unwanted growth. Typical physical and mechanical control methods include hand pulling, cutting with a water weed cutter or an electric mower, raking, suction and aeration. Chemical control methods involve the use of herbicides and dyes. Some of these methods are described in "The Conesus Lake Dockside Near-Shore Lake Weed & Algae Treatment Guide" (2002 Edition) by The Conesus Lake Association, Inc. There are significant disadvantages associated with each of these methods. These disadvantages are particularly applicable to shoreline residents in that they are either expensive, labor intensive, environmentally unsuitable, time consuming or inefficient.

One of the more practical and effective methods for controlling aquatic plant growth has been the use of benthic screens or barriers which cover a portion of the bottom surface or bed of a body of water in near-shore areas. Such screens have been found to be particularly suitable for use by shoreline residents for the purpose of controlling aquatic growth in small or localized areas such as areas used for docking, swimming or other recreational activities. The screens usually consist of a sheet of plastic or cloth material that is placed over a specific area to remove plant growth. The structure of a typical screen as described in the Conesus Guide includes a 12-foot by 12-foot wooden frame with a screening material such as burlap, a woven synthetic or a geotextile attached to the frame. The screen is anchored at the bottom of a body of water with four sandbags. The disadvantages in use of the screen are limited material durability, the requirement for a separate anchoring system, screen movement caused by water movements or gas accumulation under the screen and the bulky and cumbersome nature of the structure. The report also describes an "alternate frame approach" which may be used in place of a frame that is constructed from four 2×2's. The alternate frame includes four pieces of aluminum conduit or PVC piping filled with sand. While the alternate frame eliminates the need for a separate anchoring system, it does not provide any means for accumulated gases to escape. Also, because of the rigidity of the frame structure, the screen remains bulky and therefore cumbersome to handle.

U.S. Pat. No. 4,056,936 to Mayer discloses a benthic screen that is made from a porous fiberglass material. The material's porosity permits moving water to pass through the screen rather than causing the whole screen to move. The position of the screen is thereby stabilized. Stakes are used to secure the corners of the screen to the bed. Because the screen is porous, it transmits more light than a screen with lower porosity. The increased light allows plants to grow for a longer period of time before their demise. Also, the stakes pose a potential hazard to watercraft and can become dislodged by the movement of water or contact with a foreign object.

U.S. Pat. No. 4,577,996 to Elias et al discloses a benthic barrier which comprises a fabric coated on at least one side with silicone rubber thick enough to prevent root penetration and thin enough to allow gases formed below the barrier to pass through the coating and escape. The barrier is anchored with rocks and stakes. While the barrier effectively shades out light, it is subject to dislodgement if the anchoring stakes or rocks are displaced.

U.S. Pat. No. 4,518,280 to Fletcher discloses an aquatic weed barrier which comprises a film having a plurality of incisions therein and having a light transmittance of less than 50%. The incisions provide means for the escape of gases which may collect under the film from decomposing plants. The film is held in position with rocks. While the film kills most of the weeds, some weeds are able to survive by growing through the incisions. The use of rocks as an anchoring means is disadvantageous for the reasons previously described.

It is therefore an object of this invention to provide a benthic screen which effectively controls the growth of aquatic plants and vegetation.

It is a further object of this invention to provide a benthic screen having an opacity sufficient to reduce light penetration below the threshold point required for aquatic plant survival.

It is another object of this invention to provide a benthic screen which effectively vents gases produced by decomposing plants under the screen.

It is yet another object of this invention to provide a benthic screen which has anchoring means which are an integral part of the screen.

It is a further object of this invention to provide a benthic screen that is readily transportable, easily installed and conveniently stored by one or two persons.

SUMMARY OF THE INVENTION

In accordance with the present invention, a benthic screen is provided for controlling aquatic plant growth in near-shore areas. The screen includes a sheet of flexible material, a plurality of spaced-apart elongated retaining members that are transversely positioned across the width of the sheet, and attachment means for securing each retaining member to the sheet. The sheet is typically comprised of a polymeric material having low light transmittance such as a woven geotextile polypropylene while the retaining members are typically corrosion resistant metal rods. The attachment means is preferably a tubular collar comprising a piece of PVC pipe with a slit that passes through the wall of the pipe and extends the length thereof.

In a preferred embodiment, the screen is a unitary structure having a flexible woven geotextile polypropylene sheet attached to a plurality of retaining rods. Each rod is insertable into a corresponding piece of PVC pipe that has a slit which runs the length of the pipe. A portion of the sheet is looped into the pipe by inserting it through the slit. Thereafter, the rod is inserted into the pipe and the looped portion of the sheet in a manner such that the looped portion of the sheet is nestled between the surface of the retaining rod and the inside surface of the pipe. Caps are attached to each end of each pipe to ensure that the looped portion of the sheet and the retaining rod remain inside of the pipe.

In use, the screen is positioned on the bottom of a body of water in a near-shore area where there is aquatic plant growth. The weight of the metal retaining rods causes the sheet to quickly sink to the bottom when it is placed in position over the plant growth area. The screen is firmly anchored in position by the metal retaining rods and is not moved by water currents or decomposition gases produced by plant demise. Because the retaining rods lie horizontally on the bottom of the body of water, they do not cause an obstruction to shallow water vessels or otherwise pose a safety hazard. Since the rods are an integral part of the screen, they cannot become dislodged from the screen. Moreover, the parallel position of the retaining rods across the screen provides a channel or path for removal of plant decomposition gases which would otherwise accumulate under the screen. Without such removal, gas accumulation could create a buoying force which could cause the upward movement of the screen.

The benthic screen of this invention overcomes the disadvantages associated with the use of various bottom barriers described in the prior art. In addition to its safe and secure anchoring and its efficient removal of decomposition gases, the benthic screen is easily handled by one or two persons which makes it especially convenient for use by water front residents.

The invention, its objects and advantages will become apparent in the detailed description of the preferred embodiments.

DETAILED DESCRIPTION OF PREFERRED EMBODIMENTS

Figure 1:
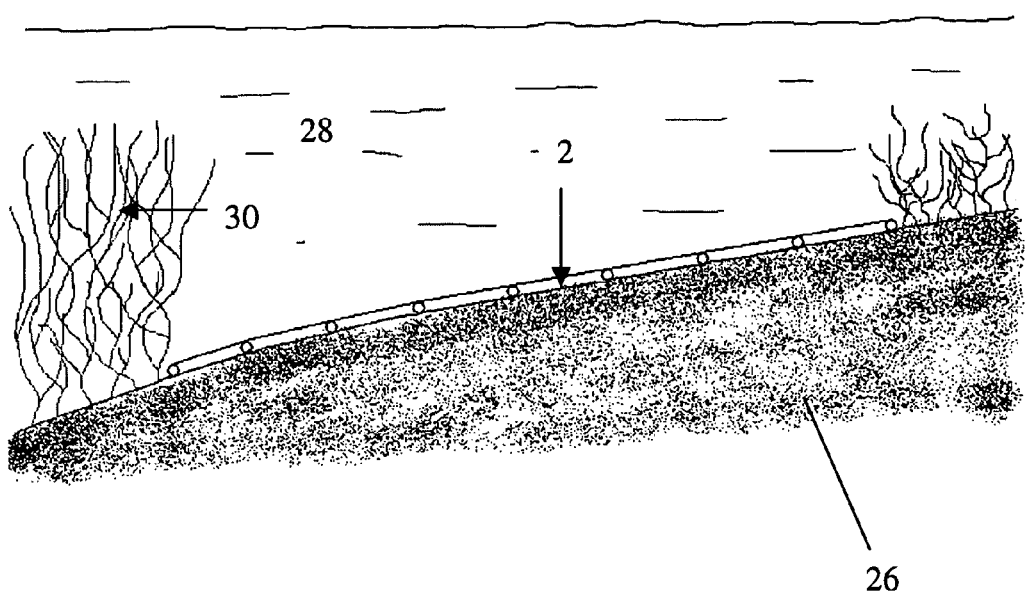
FIG. 1 is an elevation view of the benthic screen of this invention positioned on the bed at the bottom of a body of water.
Figure 2:
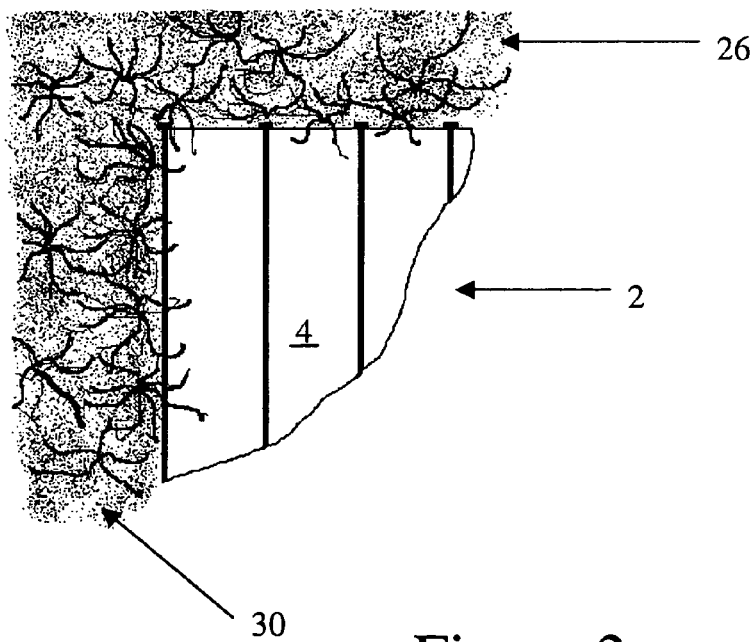
FIG. 2 is a plan view of a portion of the benthic screen of FIG. 1.
Figure 3:
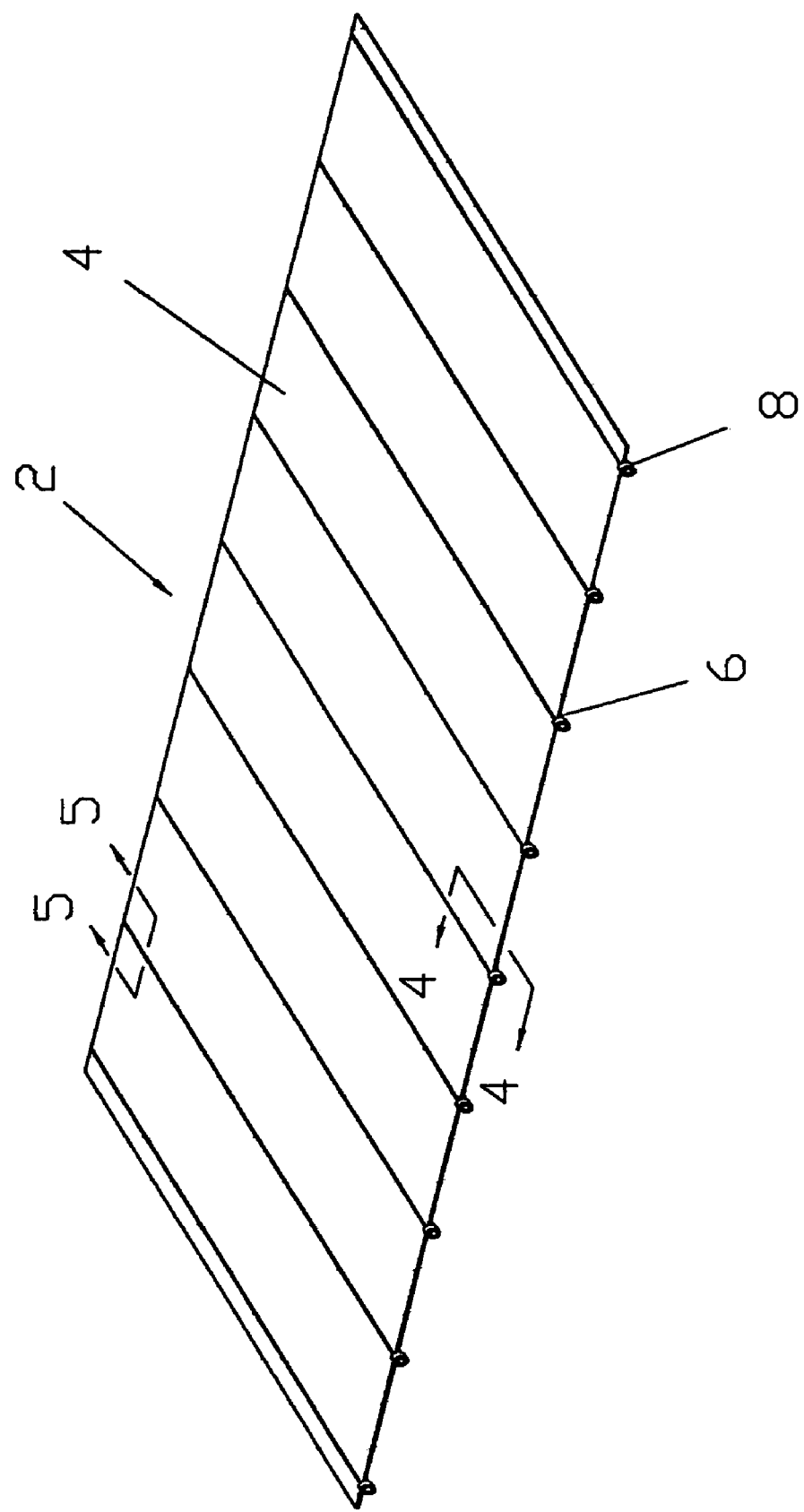
FIG. 3 is a perspective view of the benthic screen of this invention.

As shown in FIGS. 1, 2 and 3, benthic screen 2 for controlling aquatic plant growth includes a sheet of flexible material 4 having attached to one surface thereof, a plurality of substantially parallel retaining rods 10 (FIG. 7) which extend across the width of sheet 4. Retaining rods 10 are secured to sheet 4 by tubular collar 6. Benthic screen 2 is positioned on bed 26 at the bottom of a body of water 28 in a manner such that it covers aquatic plants 30 which grow from the bed. Screen 2 is held firmly in place by the weight of retaining rods 10. Growth of aquatic plants 30 which are covered by screen 2 is suppressed by the lack of light, space, air and nutrients, all of which cause their eventual demise.

Figure 4:
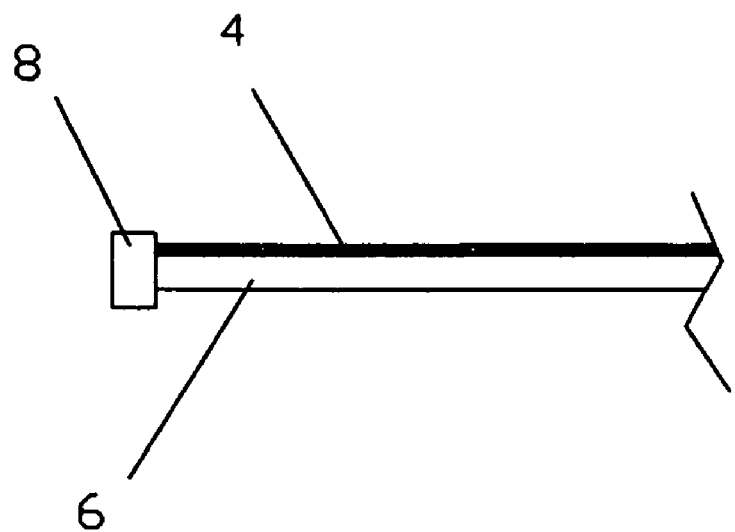
FIG. 4 is a sectional view along 4—4 of FIG. 3.
Figure 5:
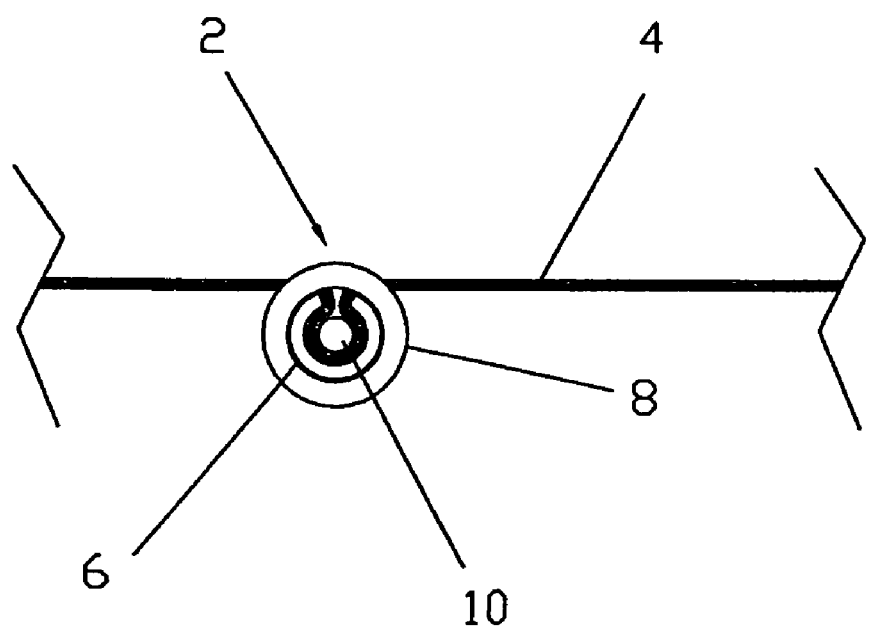
FIG. 5 is a sectional view along 5—5 of FIG. 3.
Figure 6:
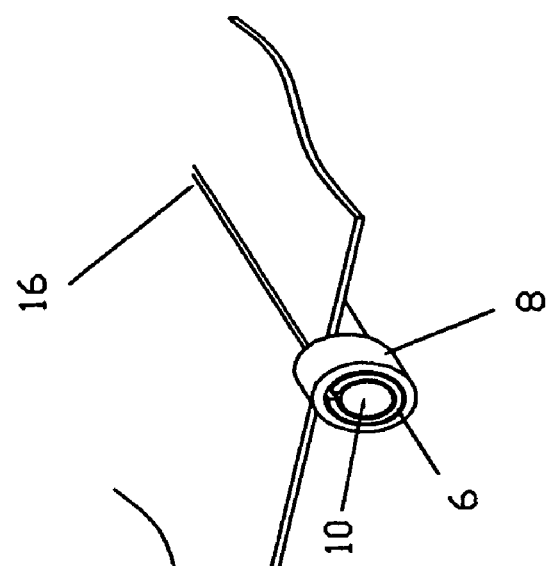
FIG. 6 is a perspective view of a portion of the edge of the benthic screen of FIG. 3.
Figure 7:
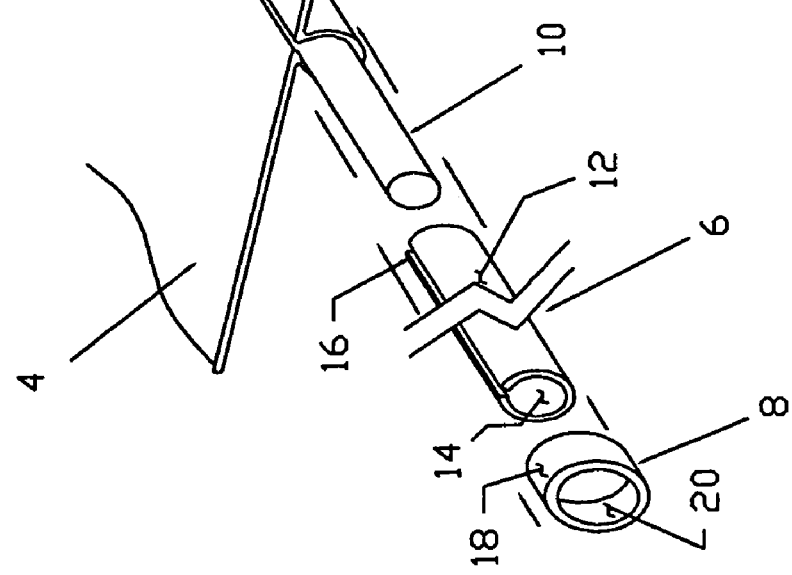
FIG. 7 is an exploded view of the portion of the benthic screen of this invention shown in FIG. 6.

As shown in FIGS. 4 and 5, retaining rod 10 is secured to sheet 4 by encasing it in tubular collar 6 which has a length that is approximately the same as the length of retaining rod 10. As shown in FIGS. 6 and 7, tubular collar 6 is comprised of a hollow cylindrical shaft having inner surface 14, outer surface 12 and slit 16 which passes through the shaft wall and is coextensive with the length of the shaft. A portion of sheet 4 is looped around the surface of retaining rod 10 and the rod and sheet assembly is inserted into tubular collar 6 in a manner such that sheet 4 is nestled between the surface of retaining rod 10 and inner surface 14 of collar 6. The length of tubular collar 6 is slightly greater than the width of sheet 4 so that the ends of collar 6 extend beyond the edges of sheet 4. End cap 8 having inner surface 20 and outer surface 18 is placed on each end of tubular collar 6 to secure retaining rod 10 in tubular collar 6. The inside diameter of end cap 8 is substantially the same as outside diameter of tubular collar 6 so that end cap 8 and the end of tubular collar 6 are retained in a mated position by friction and an adhesive material.

Tubular collar 6 is typically comprised of a piece of PVC pipe having a slit which passes through the wall of the pipe and extends the length of the pipe. End caps 6 are also comprised of PVC and are designed to be mated with the ends of the PVC pipe. They are secured in position by friction and a suitable adhesive material. The minimum width of slit 16 is at least twice the thickness of sheet 4 so that one portion of the sheet enters the slit and another portion exits the slit after it is looped around retaining rod 10 and nestled between the surface of retaining rod 10 and inner surface 14 of tubular collar 6. The maximum width of slit 16 is less than the thickness of retaining rod 10 so as to insure that the rod remains inside of the tubular collar.

In another embodiment of the invention, the attachment means for securing each retaining rod to sheet 4 is comprised of a plurality of standard plastic cable ties (not shown). In this embodiment, the retaining rods are positioned across the sheet. The plastic cable ties secure each retaining rod to the sheet by passing each tie through perforations in the sheet and around each retaining rod. Preferably, three or more ties are used to secure each rod to the sheet.

Retaining rods 10 are made from any suitable material that has a density greater than water so that they can be self-anchored on the bed at the bottom of a body of water in a near-shore location. Retaining rods that are made from iron or a steel alloy are desirable because of their cost and density. While retaining rods comprised of a corrosion resistant metallic material such as a stainless steel alloy are preferable, rods made from other metallic materials are also acceptable so long as they contain a protective coating that prevents or retards corrosion.

Sheet 4 is comprised of any flexible material that is resistant to degradation by ultra violet light and the biological and chemical environment commonly associated with bodies of water near shorelines. The material is preferably permeable to the vertical movement of gases such as hydrogen, methane and carbon dioxide, which are generated by decaying vegetation. In addition, the material has a density greater than water and an opacity that allows less than 50% light transmittance. Suitable materials include various thermoplastic synthetic polymers such as polyolefins, nylon and polyesters. Woven geotextile sheets fabricated from polypropylene and having a thickness from about 5 mils to about 50 mils are particularly suitable since they possess the desired properties.

The screen employed in the preferred embodiment is constructed by placing a 12 foot by 20 foot woven geotextile polypropylene sheet over several pieces of ½ inch PVC pipe 13 feet in length. Each pipe contains a slit that is about 30 mils in width and extends the length of the pipe. The pipes are placed substantially parallel to each other and are spaced apart by about 20 inches. The portion of the sheet that overlies each slit is inserted through the slit and looped into the pipe. The width of the inserted portion of the sheet is approximately 2 inches. After a portion of the sheet is inserted into each pipe, steel rod 10 having a diameter of about ⅜ inch and a length of about 12 feet is inserted into one end of the pipe in a manner such that sheet 4 is looped around the rod and nestled between the surface of the rod and the internal surface of the pipe. After the sheet and the steel rod are fully encased within the pipe, a small portion of pipe (6 inches or less) extends beyond the opposite sides of the sheet because the length of the pipe is greater than the width of the sheet. Since the length of each pipe also exceeds the length of each steel rod, the rod is fully encased in the pipe. End cap 8 is placed on each end of pipe 6 containing steel rod 10 and a looped portion of sheet 4. An end cap is secured to each end of the pipe in its mated position by friction fit or a suitable adhesive.

The dimensions of screen 2 and the spacing of retaining rods 10 are not critical. However, in order to facilitate handling and installation by one or two people, screen 2 is typically about 12 feet by about 20 feet. Rods 10 are typically positioned about 20 inches apart and are substantially parallel.

The screen is typically stored or transported to the installation area as a rolled or folded unit. Installation is accomplished by unrolling or unfolding the screen on or near the shoreline of the body of water where it is to be positioned. The screen is placed in the water over the area of the undesired aquatic plant growth and thereafter is lowered to the bed at the bottom of the body of water with the aquatic plants being positioned under the screen. The screen is held firmly in position by the weight and spacing of retaining rods 10 thereby eliminating the need for anchoring the screen with stakes, sandbags, large rocks or other external anchoring means. Gases produced by plants covered by the screen escape by first moving in the channel formed between adjacent retaining rods to the edge of the screen, and then by passing around the edge of the screen and upward to the water surface. Plant deterioration is accelerated by the absence of adequate sunlight which is reduced or blocked by the opaqueness of sheet 4. The materials from which the screen, including the sheet, rods and tubular collars, are constructed make it resistant to deterioration by corrosion or degradation. After a period of time, ranging from a few days to a few weeks depending on the growth intensity and plant density, the plants are killed. The screen is then relocated to another area in which the undesirable aquatic plant growth is to be removed. Several screens may be adjacently positioned for plant removal in larger areas.

The benthic screen of this invention effectively removes undesirable aquatic plant growth such as seaweed from near-shore areas that are otherwise unsuitable for swimming or other forms of recreational water activities. Since the benthic screen does not have a rigid frame, it is not cumbersome to store, transport or install and is easily handled by one or two people. It is relatively inexpensive to construct, requires little or no maintenance and removes unwanted growth in localized areas in an efficient and expeditious manner. The screen is ideally suited for use by homeowners with water frontage ranging from a few feet to several hundred feet.

The invention has been described in detail with particular reference to certain preferred embodiments thereof, but it will be understood that variations and modifications can be effected within the spirit and scope of the invention.

I claim:

1. A benthic screen for controlling aquatic plant growth comprising:
   a. a sheet of flexible material;
   b. a plurality of spaced apart elongated, metal retaining rods that are transversely positioned across the width of the surface of said sheet and are attached thereto; and
   c. a tubular collar for attaching each elongated metal retaining rod to the sheet, said tubular collar being comprised of a hollow cylindrical shaft having an inner surface, an outer surface and a slit which passes through the shaft wall and is coextensive with the length of the shaft;
   each of said rods being positioned inside of the corresponding tubular collar's hollow cylindrical shaft with a portion of said sheet being positioned so that it extends through the slit in the shaft wall, and another portion of said sheet being positioned between each rod and the inner surface of the corresponding tubular collar's hollow cylindrical shaft.

2. The benthic screen of claim 1 wherein the sheet of flexible material is comprised of a polymeric material.

3. The benthic screen of claim 1 wherein the sheet of flexible material is comprised of a woven geotextile polypropylene fabric.

4. The benthic screen of claim 1 wherein the metal rods contain a protective coating.

5. The benthic screen of claim 1 wherein said tubular collar has an inside diameter that is greater than the diameter of the corresponding retaining rod.

6. The benthic screen of claim 1 wherein the minimum width of the slit is at least twice the thickness of the sheet of flexible polymeric material.

7. The benthic screen of claim 1 wherein the tubular collar is comprised of polyvinyl chloride pipe having a slit which passes through the pipe wall and is coextensive with the length of the pipe.

* * * * *